United States Patent [19]
Tyrrell et al.

[11] Patent Number: 5,060,229
[45] Date of Patent: Oct. 22, 1991

[54] SERIAL TRANSPORT FRAME FORMAT METHOD

[75] Inventors: Raymond E. Tyrrell, Raleigh; Stephen C. Dunning, Cary; Richard J. Sanders, Jr., Raleigh; Claude M. Hurlocker, Raleigh; Michael J. Gingell, Raleigh; Jeffrey P. Jones, Raleigh, all of N.C.

[73] Assignee: Alcatel NA Network Systems Corp., Raleigh, N.C.

[21] Appl. No.: 351,458

[22] Filed: May 12, 1989

[51] Int. Cl.$^5$ ............................. H04J 3/12; H04J 3/16
[52] U.S. Cl. .................................. 370/110.1; 370/99; 370/112
[58] Field of Search ................. 370/110.1, 82, 83, 99, 370/112, 95.1, 95.2, 100.1, 105.1, 95.3

[56] References Cited
U.S. PATENT DOCUMENTS

| | | | |
|---|---|---|---|
| 4,719,624 | 1/1988 | Bellisio | 370/110.1 |
| 4,764,921 | 8/1988 | Graves et al. | 370/110.1 |
| 4,928,276 | 5/1990 | Blondeau, Jr. et al. | 370/110.1 |

Primary Examiner—Douglas W. Olms
Assistant Examiner—Wellington Chin
Attorney, Agent, or Firm—Peter C. Van Der Sluys

[57] ABSTRACT

A serial transport frame format is described which transfers data between two locations. The serial transport frame format comprises a fixed number of channels per frame, each channel having a predetermined size. One channel per frame contains frame synchronization information and each channel which conveys data, contains a first portion for the transfer of data and a second portion which contains associated control information.

30 Claims, 12 Drawing Sheets

SERIAL TRANSPORT FRAME FORMAT METHOD

TECHNICAL FIELD

The present invention relates to a serial transport frame method for use in telephony but not necessarily restricted thereto. The serial transport frame format method describes a technique for transmitting serial information comprising a plurality of channels wherein each channel contains data and channel associated control information. Frame synchronization is included in one channel per frame.

DESCRIPTION OF THE PRIOR ART

The adoption of the Synchronized Optical Network standard (SONET) within the United States and elsewhere (American National Standards Institute Standard T1.105-1988 entitled "Digital Hierarchy Optical Interface Rates and Formats Specification"), defines a standard for the transfer of information by means of optical fiber. With such a standard there is a need for transferring information associated with lower speed telephony standards such as the digital signal standard, or DS-X standard (where "X" is an integer, such as 0, 1, 2 and 3). The DS-X standard is commonly used in telephony, with DS-0 directed to channels that operate at 64 kilobits per second (kbits/sec), DS-1 directed to channels operating at 1.544 megabits/second (mbits/sec), DS-2 operating at 6.312 mbits/sec, and DS-3 operating at 44.736 mbits/sec. With the DS-X standard, each channel comprises 8 bits of data while the signalling and control information associated with such a channel is typically inserted at the least significant bit of designated frames of that channel in what is commonly referred to as a "rob-bit" method. This method was patented by the American Telephone and Telegraph Corporation (ATT) and is widely used in the United States and Canada.

In Europe, the signalling and control information associated with a digital channel is typically presented in a designated repeating frame of that channel so that the data is not compromised by the signalling and control information.

The SONET standard defines the rates and formats for optical interfaces with the basic signal broken into two main portions, one portion for what is called Transport Overhead and one portion for payload. The Transport Overhead comprises Section Overhead and Line Overhead while the payload contains Path Overhead and payload data. The payload data may be a DS-3 type signal or lower speed DS-0, DS-1C, or DS-2 signals presented in what is called a Virtual Tributary (VT). It is within this payload data that the signalling and control information of the channels is maintained for whatever signalling format is used (e.g. AB or A,B,C,D (ESF) signalling). In SONET, such signalling and control information is stored in a prescribed manner.

However within devices used to interface or communicate with the SONET standard, there is a need to be able to internally serially transfer data in a flexible and reliable manner. The present serial transport frame format is a method that meets this need.

In particular the use of SONET standard has resulted in the creation of terminal multiplexers (TM's), add-/drop multiplexers (ADM's), fiber transmission systems (FTS) and the like for placement of information onto a fiber optic as well as for demultiplexing the information transmitted across a fiber optic so as to obtain the various DS-X channels.

Each TM, ADM, and FTS requires that information be rapidly transferred between various modules within these devices so as to be operated on by these modules. In order to transfer this internal information in a fast, reliable, and cost-effective manner a serial transport frame method has been devised for sending such information so that both the data and the associated channel control information (e.g. signalling and timing information) are transparently conveyed between any two modules. The serial transport frame format further provides for the transfer of such information in a frame format wherein frame synchronization information is provided in a standardized form. The frame format also provides for the transfer of general control information in a standardized form. This general control information is also in the form of data and associated channel control information, the latter potentially including data valid (V) and interrupt (I) bits and addressing information. Each control channel can be used to communicate control functions between modules within any device. Further information concerning the VI control channel is presented in co-pending U.S. application filed on Mar. 10, 1989 entitled Embedded Control Technique for Distributed Control Systems, inventor Hal Thorne. This application is hereby incorporated by reference.

Although serial communication standard exist, such as RS232C and RS422 standards, these standards define signal levels and the like but do not define a serial frame of data comprising a plurality of channels where each channel contains data and associated channel control information. It is to such a serial transport frame format that the present invention is directed. The overall result is an efficient method for the transfer of telephony channel information between modules associated with devices that operate on this data and in particular for such devices used in conjunction with interfacing and interacting with the SONET Standard for the exchange of information.

SUMMARY OF THE INVENTION

A serial transport frame format defines a frame for the transfer of 32 channels of information, each channel comprising 16 bits. Each frame is typically generated at a frequency of 4.096 megahertz.

The first channel of each frame preferably contains a synchronization word while the last channel may optionally contain general maintenance or control information. This maintenance and control information can provide codes associated with looping so as to isolate faults as well as to control communications between modules connected at respective ends of a serial bus (link) associated with the serial transport frame format. Regardless of the channel, a first portion of the channel contains data while a second portion of the same channel contains associated control information. Such control information may include timing information associated with that channel of data.

When the channels contain DS-0 data, the first 8 bits of each 16 bit channel contains the actual DS-0 data (such as voice data) with the remaining bits containing the signalling information (e.g. A, B or A, B, C, D information) and timing information associated with that DS-0 channel, as well as channel parity information.

OBJECTS OF THE INVENTION

It is therefore a principal object of the present invention to provide a serial transport frame format wherein information to be conveyed between two locations comprises a predetermined number of channels, each channel containing a predetermined number of bits with a first portion of the channel containing data and a second portion containing channel associated control information.

Another object of the present invention is to provide a serial transport frame format wherein the first channel of the format comprises synchronization data and associated control information to be used so as to assure proper transfer of each frame.

A still further object of the present invention is to provide a serial transport frame format wherein at least one channel may contain general control data and channel associated communication information.

A still further object of the present invention is to provide a serial transport frame format specifically for use in the transfer of information between modules used to define devices used to convey information to and from a synchronized optical network standard.

Another object of the present invention is to provide a serial transport frame format of the above description, wherein a plurality of channels of each frame are directed to the transfer of telephony data and associated control information, with the control information containing signalling data and timing data.

A further object of the present invention is to provide a serial transport frame format of the above description, wherein each channel further comprises parity information concerning the data and associated control information contained within the channel.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, and which:

FIG. 9, comprising

FIGS. 9A-9C are put together to form FIG. 9.

FIG. 10 is an overall block diagram of another serial transport frame format generator, specifically interfacing a DS-1 type signal into a serial transport frame format, and corresponding to a specific ASIC.

BEST MODE FOR CARRYING OUT THE INVENTION

Figure 1:
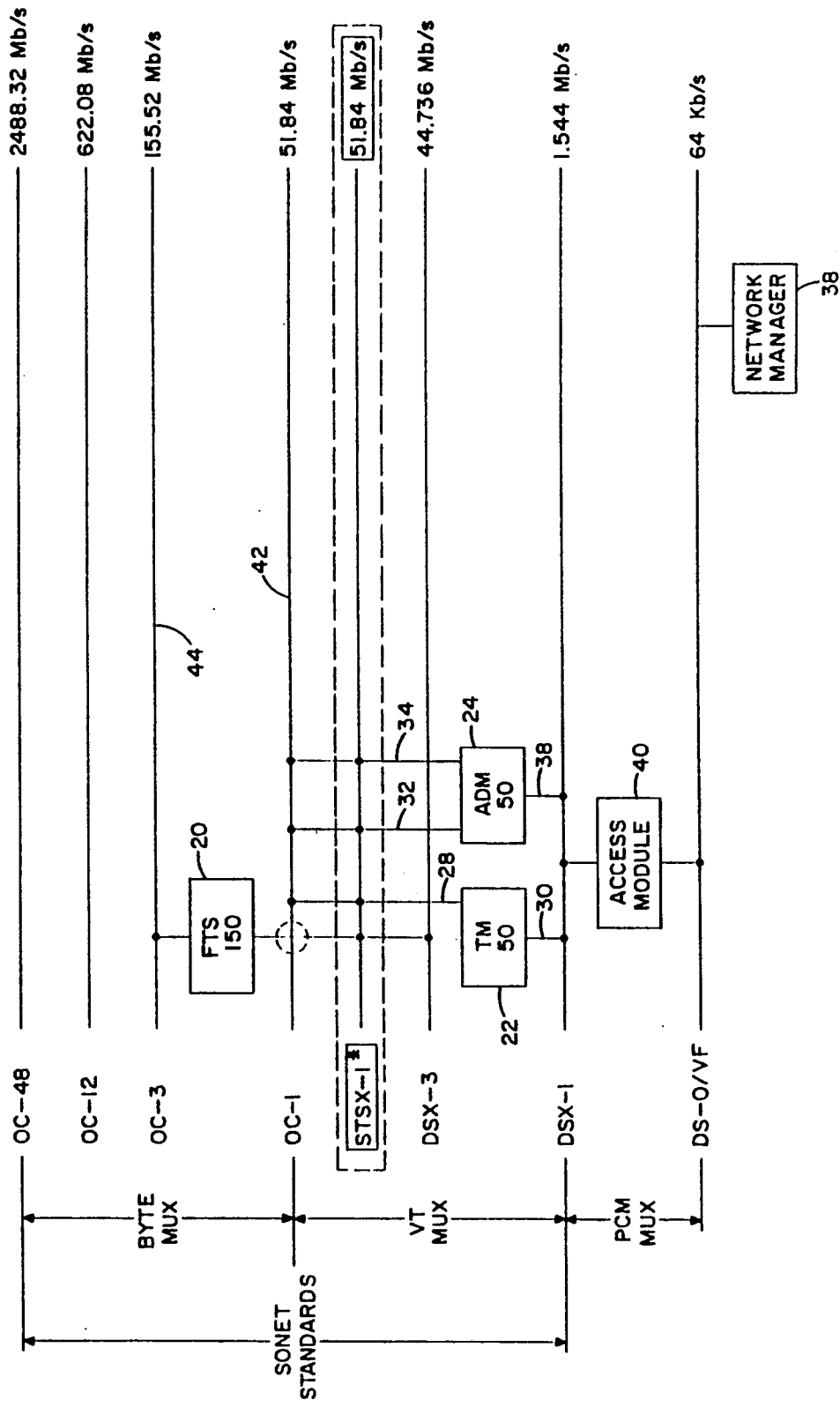
FIG. 1 is a block diagram of a fiber transmission system, a terminal multiplexer and an add/drop multiplexer, which combine to form a transmission facility for use within a synchronized optical network standard.
Figure 6:
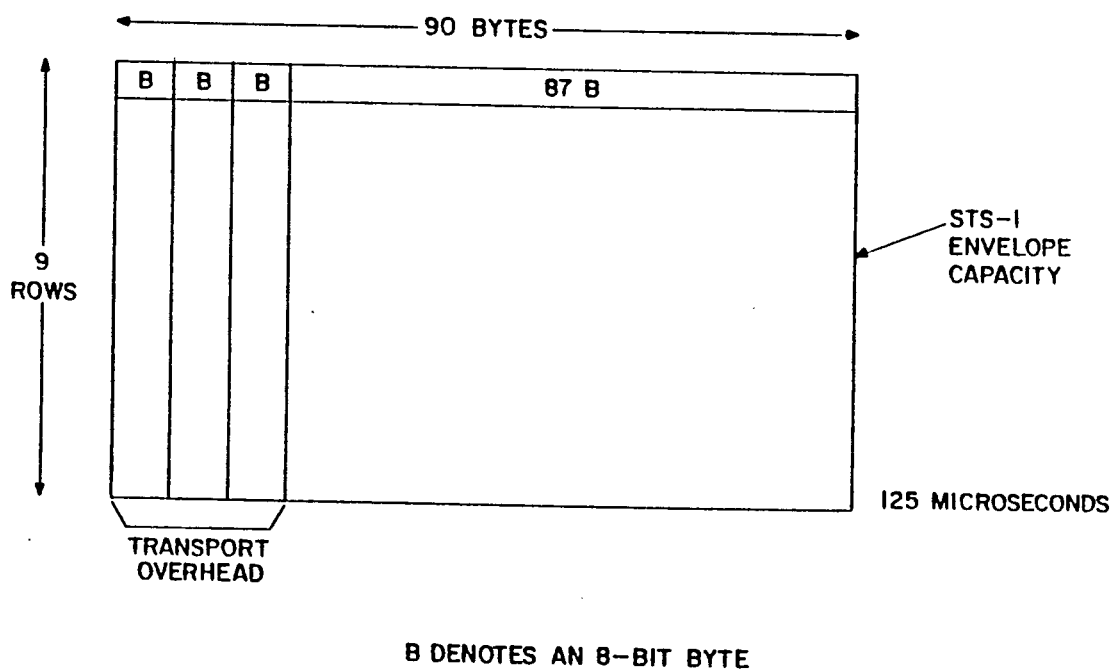
FIG. 6 is a diagram showing the frame format for a synchronous transport signal frame, specifically an STS-1 frame illustrating both transport overhead and the envelope capacity.

FIG. 1 illustrates various devices 20, 22 and 24, that can interface with an optical carrier (fiber optic) transmission medium such as the optical carrier medium operating within the Synchronous Optical Network (SONET) standard adopted by the American National Standards Institute, Inc. (ANSI) as set forth in their standard No. TI.105-1988 entitled "Digital Hierarchy Optical Interface Rates and Formats Specification". This standard is hereby incorporated by reference. According to the SONET standard an optical carrier level (such as OC-1, OC-3, OC-12, OC-48) is the signal that results from an optical conversion of a Synchronous Transport Signal (STS) operating at the same level. The STS-1 (STS level 1) is defined as the basic building block signal with a transfer rate of 51.840 megabits per second (Mbit/s). Thus an STS-N optical carrier level is simply the level 1 rate multiplied by N, where N is an integer equal to or greater than one. The STS bit stream is presented in a frame where the STS-1 frame comprises 810 bytes which can be visualized as nine rows, each 90 bytes wide (see FIG. 6), with the frame period equal to 125 microseconds. The first three column comprise what is called transport overhead, which in turn comprises section and line overhead. Section overhead deals with the SONET section layer which is directed to the transport of STS-N frames across the physical medium.

The line overhead deals with the line layer which is directed to the transport of Path layer payload. The payload is a synchronous payload whose envelope can reside across two STS-N envelopes (see FIG. 6).

Figure 7:
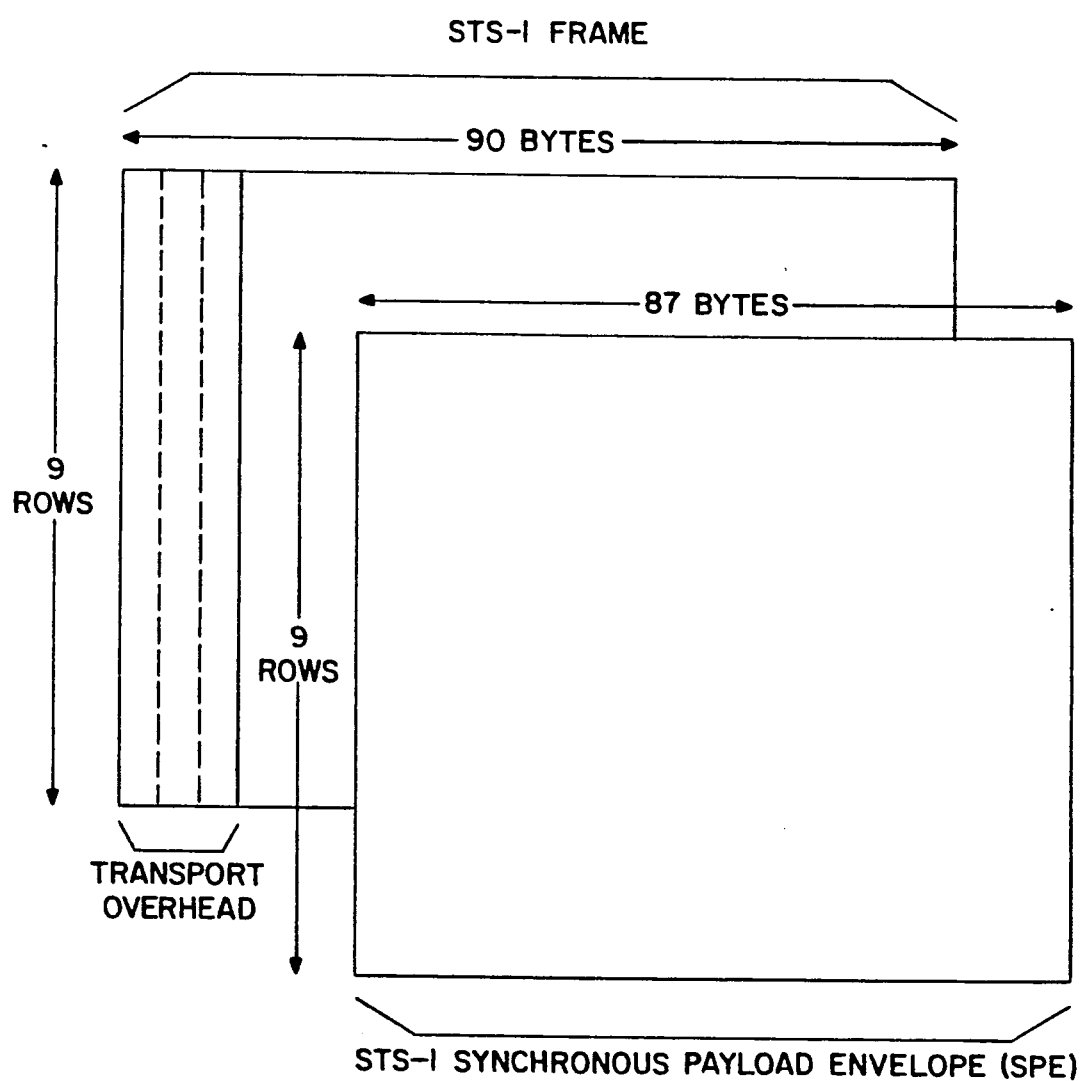
FIG. 7 is a diagram illustrating the synchronous payload envelope for transport within the STS envelope capacity.

The synchronous payload envelope (SPE) consists of nine rows, each 87 columns wide as shown in FIG. 7. The first column contains path overhead leaving 774 bytes available for payload. It is within this payload that channels of telephonic information, comprising channels conforming to various digital signal standards, are contained. As seen in FIG. 1, these standards include DS-0 (64 kbits/s), DS-1 (1.544 mbits/s) and DS-3 (44.736 mbits/s).

The fiber transmission system (FTS) 20 is interconnected between an OC-3 channel operating at 155.52 megabits per second and an electrical DS-3 channel operating at 44.736 megabits per second. The fiber transmission system can also connect to a 51.84 megabits per second electrical interface identified as STSX-1.

This interface is an electrical implementation of the synchronized optical network interface (SONET).

The terminal multiplexer (TM) 22 has a high speed port 28 operating at 51.84 mbits/s that can be equipped with either an electrical interface (STSX-1 electrical path) or a fiber optic interface for operation with the OC-1 SONET Standard. The low speed port 30 of the terminal multiplexer is interfaced with a DSX-1 electrical telephony standard operating at 1.544 megabits per second. Each DS-1 interface can incorporate up to 24 DS-0 channels each operating at 64 kilobits per second. The terminal multiplexer therefore interfaces from 1-28 DS-1 channels with one OC-1 or one STSX-1 carrier.

The add/drop multiplexer (ADM) 24 is functionally identical to the terminal multiplexer except that the ADM is equipped with east and west high speed interfaces 32 and 34, respectively. The low speed port 38 is similar in operation to the low speed port 30 associated with the terminal multiplexer.

The access module 40 provides conventional interfacing between DS-0 channels operating at 64 kilobits per second and DS-1 channels operating at 1.544 megabits per second.

Figure 2:
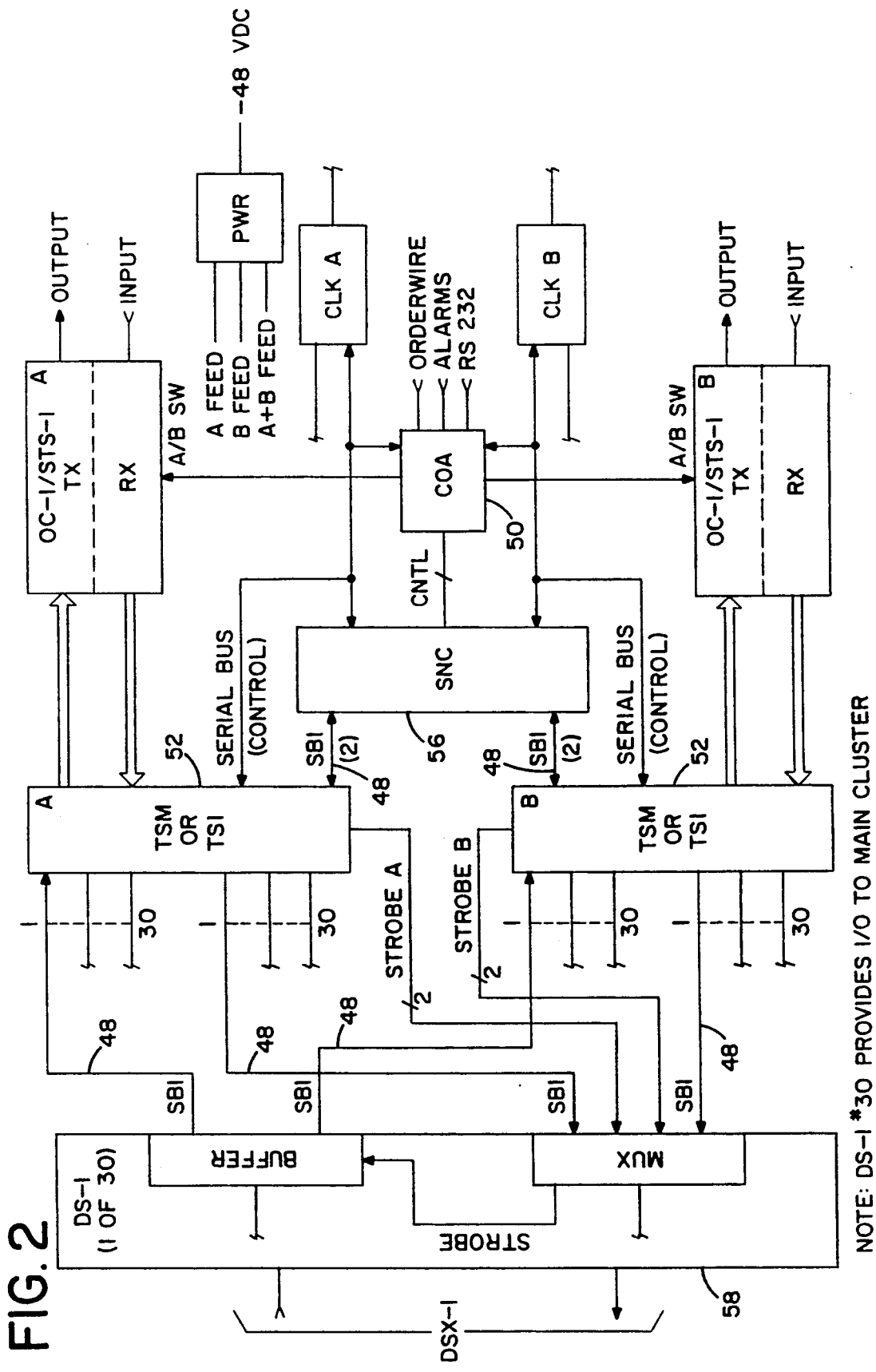
FIG. 2 is an overall block diagram of a terminal multiplexer such as shown in FIG. 1, illustrating serial busses which use the serial transport frame format of the present invention to transfer data and associated control information between modules of the terminal multiplexer.
Figure 3:
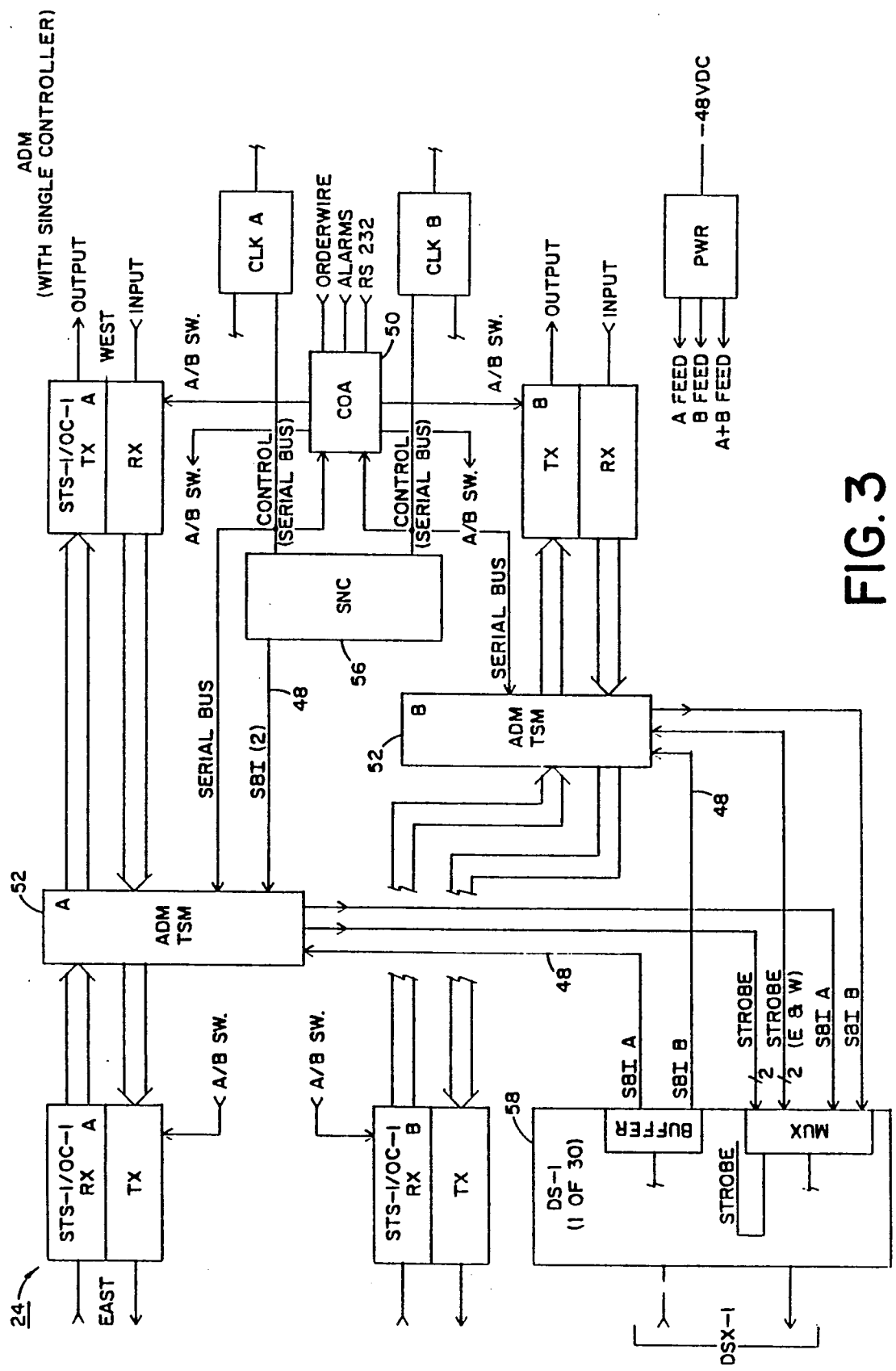
FIG. 3 is a block diagram of an add/drop multiplexer such as shown in FIG. 1, illustrating serial busses which use the serial transport frame format for the transfer data and associated control information between modules forming the add/drop multiplexer.
Figure 4:
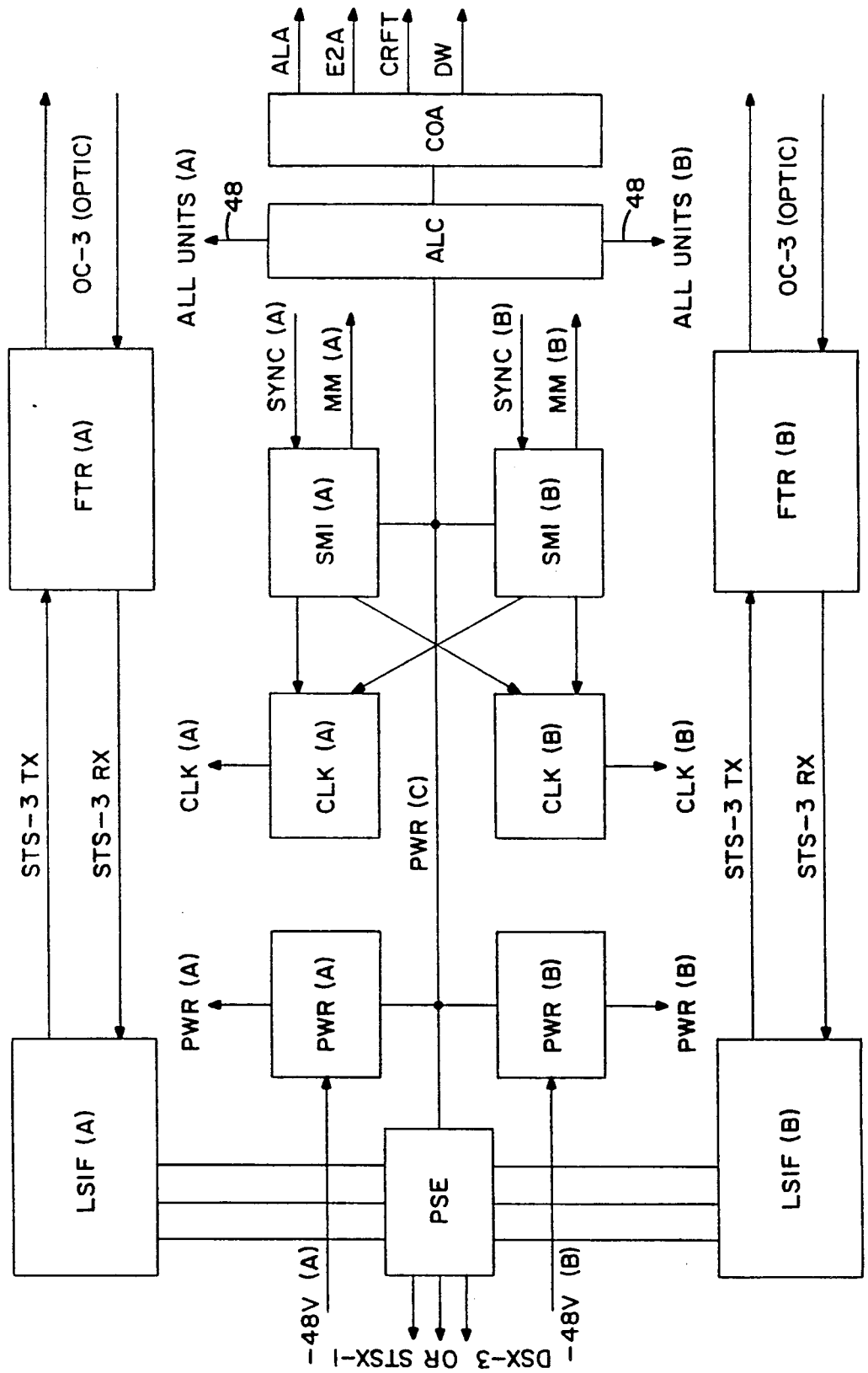
FIG. 4 is an overall block diagram of a fiber transmission system such as shown in FIG. 1, illustrating serial busses which use the serial transport frame format of the present invention.

As seen in FIGS. 2, 3 and 4 the terminal multiplexer 22, add/drop multiplexer 24, and the fiber transmission system 20 each use serial busses 48 which utilize the serial transport frame format of the present invention. By each device using the same serial transport frame format for the exchange of information within modules comprising the respective device, a straightforward implementation for transferring information between modules is achieved.

Figure 8:
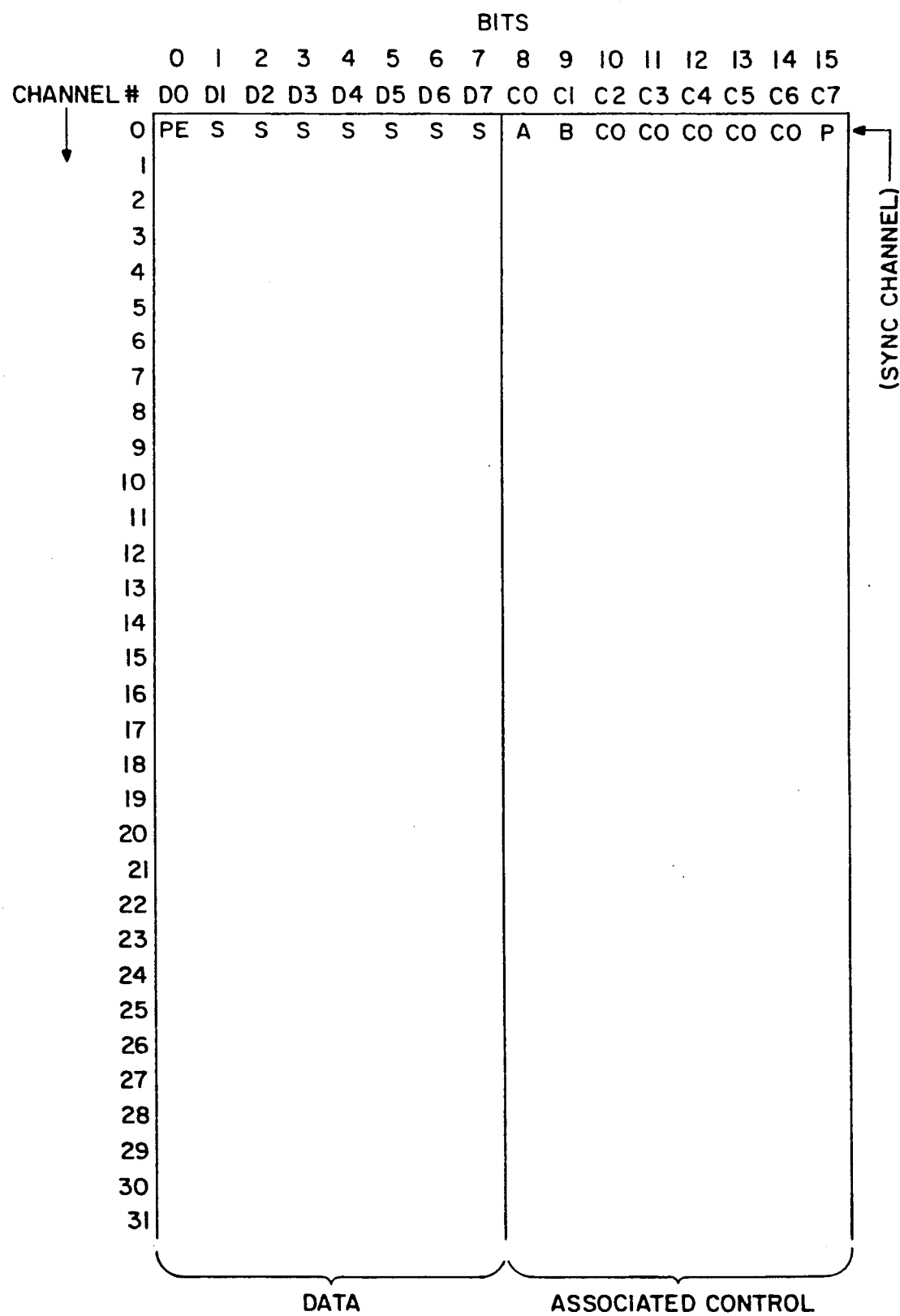
FIG. 8 is a diagram showing the data bits associated with one frame of the serial transport frame format.
Figure 9A:
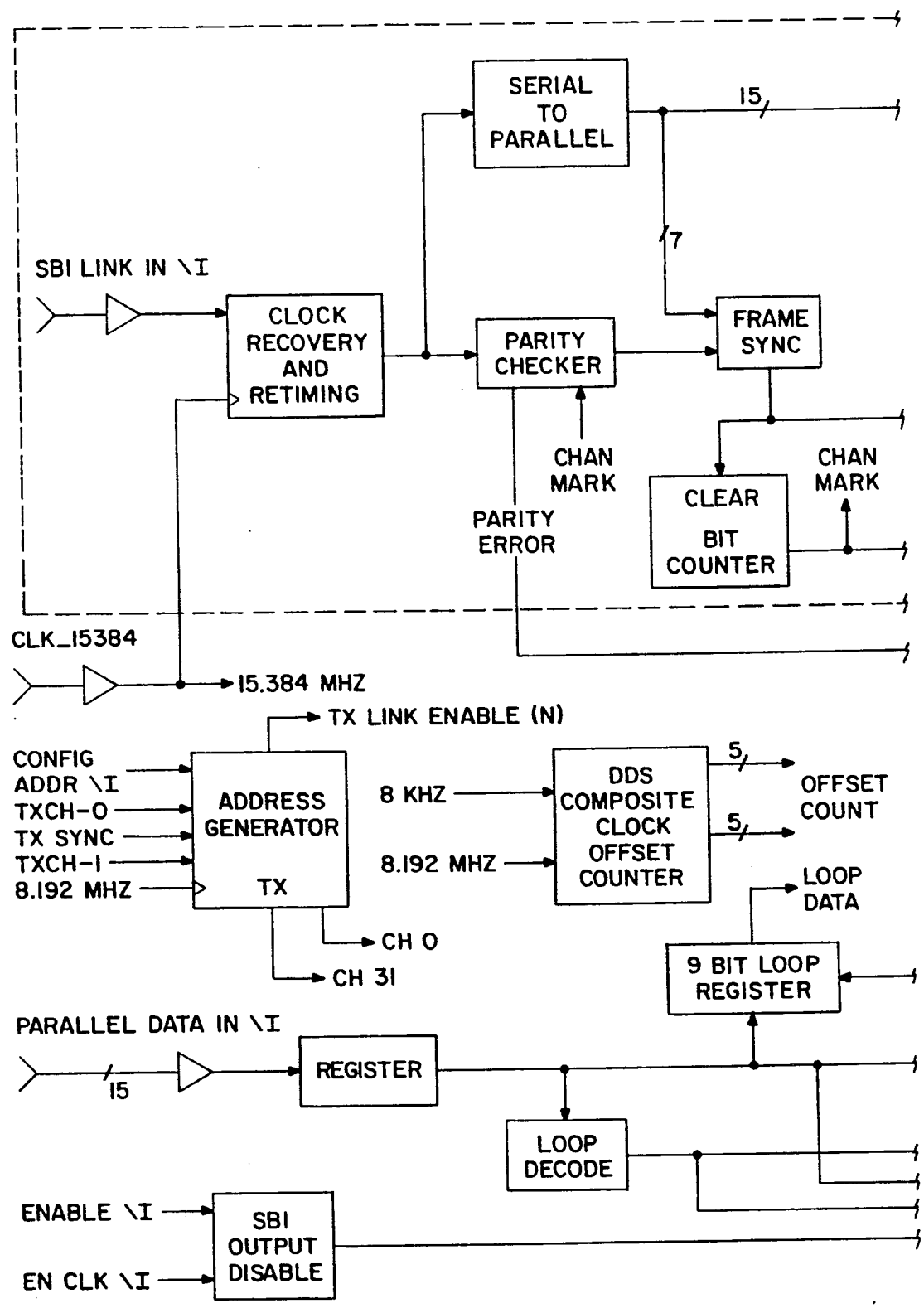
FIGS. 9A-9C, is an overall block diagram of a serial transport frame format generator wherein parallel data is converted into the serial transport frame format, this diagram corresponding to an application specific integrated circuit (ASIC).
Figure 9B:
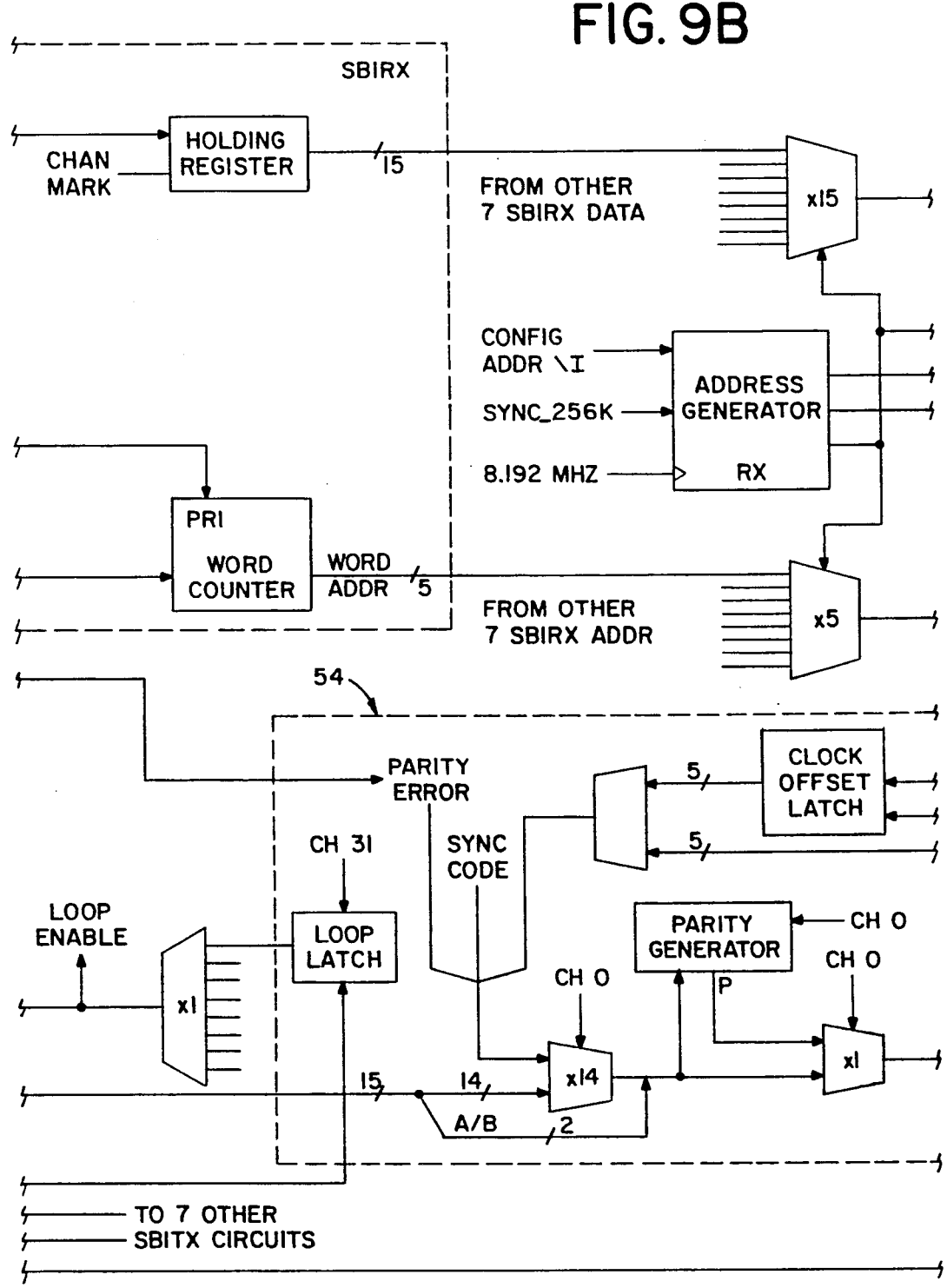
Figure 9C:
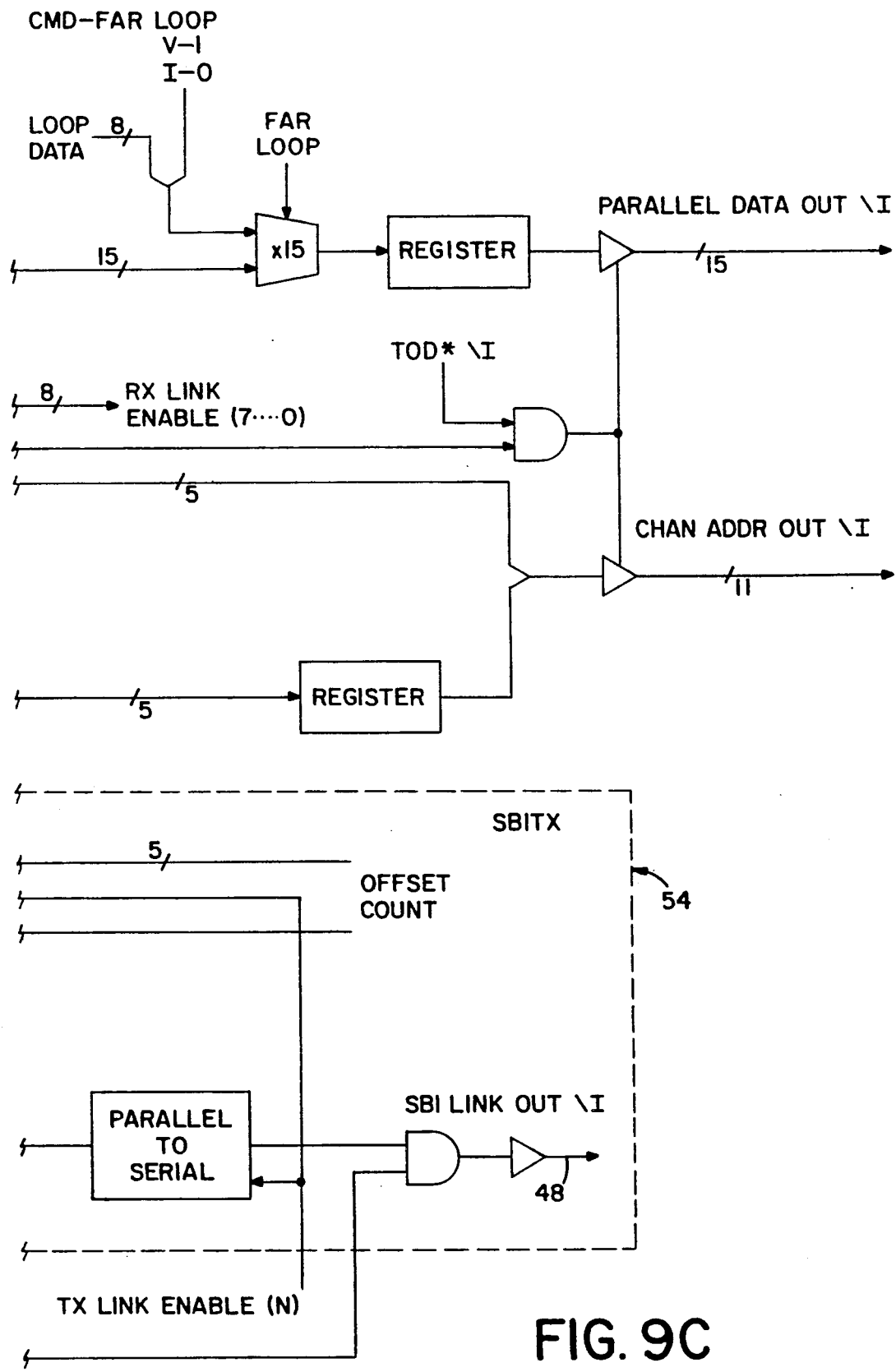
Figure 9D:
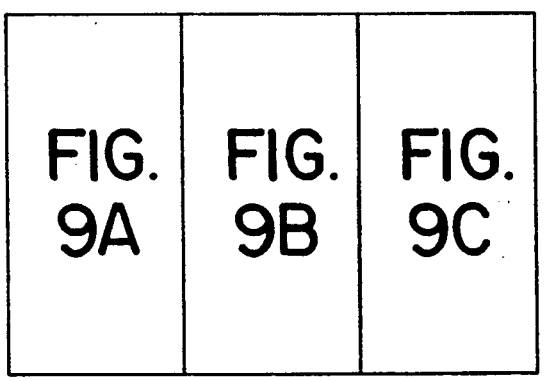
FIG. 9D is a diagram showing how

The basic nature of the serial transport frame format is shown in FIG. 8. As seen there, sixteen bits comprise each channel of information. There are 32 channels per frame. The first bit of each channel (bit #0) is the most significant (MSB) and the sixteenth bit is the least significant (LSB).

The first eight bits of each channel comprise data (bits D0 through D7) while the remaining bits represent associated control information (bits C0 through C7). The associated control bits may represent any type of control information depending upon the nature of the associated channel data and the needs of the modules interconnected to a serial bus transferring information within this format. This associated control information may comprise address information regarding the channel data, timing information regarding the channel data, data valid and interrupt bits (V and I bits) and parity information regarding the channel. In all situations, the associated control bits represent information respecting the channel data or are "don't care" bits; i.e., bits that convey no particular information regarding the channel data.

Channel zero of each serial transport frame format represents synchronization data and associated control information.

For the device implementations shown in FIGS. 1, 2 and 3, each terminal multiplexer 22 and each add/drop multiplexer 24 can interface up to 28 DS-1 channels each operating at 1.544 megabits per second with one STSX-1 or one OC-1 channel. Each serial bus is called a serial link and is identified by a number corresponding to its link number. A serial link conveys information in the serial transport frame format, and thus 32 channels are associated with each serial link.

For the terminal multiplexer shown in FIG. 2 and the add/drop multiplexer shown in FIG. 3 the links are assigned the following responsibilities set forth in Table 1:

TABLE 1

| Serial Link Assignment for TM and ADM devices | |
|---|---|
| Serial Link # | Assignment |
| 0 | DS-1 #1 |
| 1 | DS-1 #2 |
| 2 | DS-1 #3 |
| . | . |
| . | . |
| . | . |
| 27 | DS-1 #28 |
| 28 | DTAU (digital test access unit for DS-1 test access) |
| 29 | Network Manager |
| 30 | time slot interchanger to controller |
| 31 | time slot interchanger to controller |

As noted above, each link comprises 32 channels, and channel 0 of each link contains synchronization information. For TM and ADM applications, the associated control information for channel zero of each link is set forth in Table 2 and FIG. 8.

TABLE 2

| Channel 0 Bit Definitions for all TM and ADM Serial Links | | | | | | | | | | | | | | | |
|---|---|---|---|---|---|---|---|---|---|---|---|---|---|---|---|
| PE | S | S | S | S | S | S | S | A | B | CO | CO | CO | CO | CO | P |
| 0 | 1 | 2 | 3 | 4 | 5 | 6 | 7 | 8 | 9 | 10 | 11 | 12 | 13 | 14 | 15 | where
PE is parity error bit.
S is synchronization bit pattern (Barker Code)
A and B represent the A or B select status bit (A transport path or B transport path)
CO represents the composite clock offset bit value
P represents the channel parity bit For channel 0, channel parity bit P is of even parity on the 16 bit channel. For channels 1-31 this bit is odd parity on the respective 16 bit channel. When channel parity errors are detected in any serial transport frame channel by an associated serial receiver, the corresponding serial transmitter sends an active parity error bit to the source. This error bit indicates to the source that problems may exist with the transmitter. When predetermined channel parity error thresholds are exceeded, a system switchover can be initiated by controller 50 (see FIGS. 2 and 3).

The parity bit (P) is associated with the current serial frame transport while the parity error bit (PE) persists for one frame following the error.

The composite clock offset value associated with channel 0 is accumulated on a multiframe basis consisting of two frames. By using the alternating synchronization pattern to accumulate the composite clock offset bits, 10 bits are accumulated.

The A/B select bits represent which transport media path is to be used. In telephony, two transport media paths are typically required to maintain high reliability of any desired communication. As seen in FIGS. 2, 3 and 4 these media paths are generally referred to as path A or path B. The A/B select bits are distributed via a broadcast technique from the time slot multiplexer (TSM) or time slot interchanger (TSI) 52 associated with controller channel 0. Details of the time slot interchangers are presented in co-pending application Ser. No. 295,887, filed Jan. 11, 1989, and assigned to the present assignee. This application is hereby incorporated by reference. When the serial transport frame generator module 54 as shown in FIG. 9 receives channel 0 from the time slot interchanger parallel bus, the channel is overlaid with the received A/B bits, synchronization pattern, composite clock offset value, and parity bits and new.

Serial Links 0-27

For the TM and ADM modules 20 and 22, serial links 0 through 27 have channels 1-31 defined in a manner as set forth in Table 3 (channel 0 is the same for all serial links).

TABLE 3

Channels 1-31 Bit Definitions for TM and ADM Links 0-27

Channel 1: contains the virtual tributary (VT) pointer byte if the SONET Floating VT Mode is selected (see SONET standard).

Channel 2: Required only for the "Floating VT Mode".

Channel 3: Contains the signalling information used by the add/drop multiplexer for through connections, that is connections which pass from east to west without the addition or subtraction by the ADM. The ADM high speed interfaces are provisioned to use this information or to reformat and use the signalling information included as part of the DS-0 channel being inserted. Channel 3 is also used to insert and extract the DS-1 F bit (the 193rd framing bit) when terminating a data link conforming to the Extended Superframe (ESF) format. The high speed part is further provisioned to provide a fixed relationship between the F bit sequence and the signalling master frame sync. The DS-1 unit only uses the F bit and the master frame signal (MFS) while ignoring the remaining bits. Channel 3 can also be provisioned to transport the DS-1 193rd bit for bit synchronous applications.

Bits 2-5 of channel 3 carry the signalling information in the SONET Standard format, bit 6 contains the F bit (193rd bit), bit 12 contains the multi-frame synchronization signal (high for frames 1-12, low for frames 13-24), bit 13 contains a bit to indicate twice the Extended Superframe synchronization frequency (high for frames 1-6 and 13-18 and low for frames 7-12 and 19-24) and bit 14 contains the transmit H4 master frame synchronization bit (see SONET Standard) which is a positive edge aligned with the 500 microsecond virtual tributary superframe. Bit 15 is the parity bit which is odd parity on bits 0-14. Bits 0, 1 and 7 are reserved for future use and bits 8-11 are not assigned.

Channels 4-27:

Each channel contains one DS-0 channel from DS-0 channel #1 to DS-0 channel #24. Bits 0-7 contain the voice or data information while bits 8, 9, 10 and 11 contain the ABCD signalling highway information respectively. Bit 12 contains the signalling frame synchronization bit (high for frames 6-17, low for frames 18-5) and bit 13 contains a bit to indicate twice the signalling frame synchronization frequency (high for frames 6-11 and 18-23 and low for frames 12-17 and 24-5). Bits 14 and 15 are not assigned.

Channel 28:

This channel is reserved for an add/drop multiplexer core or line shelves and in particular for use as a universal broadcast channel. The line shelf generates the signal and sends it to the time slot interchanger to be broadcast.

Channels 29 and 30: Are not assigned.

Channel 31: This channel is used by the terminating devices (such as the DS-1 or line shelves) for communication to the system controller. The data bits are assigned to bits 0-7, the valid or V bit is assigned to bit 8, the interrupt or I bit is assigned to bit 9 and the address offset bits are assigned to bits 10-14. Bit 15 is the parity bit and the V and I bits are active low.

Serial Link 28

Not assigned. This link is reserved for DTAU (digital test access unit).

Serial Link 29

This link is responsible for communications with a network manager 38. The serial transport frame format channel assignment for channels 1-31 are presented below (channel 0 is discussed earlier):

The network assignments for the serial transport frame format channels 1-25 are programmable by the TM or ADM which is equipped with a time slot interchanger.

Assignments for channels 1-16 are programmable for systems equipped with time slot multiplexers.

Channels 17-25 are not accessible by the timeslot multiplexer.

The ADM has two sets of overhead channels, one for the east and one for the west. The TM has one set for the incoming signals. The SONET channel assignments are limited as set forth in Table 4.

TABLE 4

| Network Manager SONET Channel Assignment Constraints | | |
|---|---|---|
| | Systems Equipped With | |
| SONET Overhead | TSM | TSI |
| Section DataCom (D1-D3) | yes | yes |
| Line DataCom Channel (D4-D12) | yes | yes |
| User Channel (F1) | yes | yes |
| User Channel (F2) | yes | yes |
| Growth Channel (Z1) | yes | yes |
| Growth Channel (Z2) | yes | yes |
| Growth Channel (Z3) | no | yes |
| Growth Channel (Z4) | yes | yes |
| Growth Channel (Z5) | yes | yes |

Channels 26-28: This channel contains the V and I channel from the TM or ADM controller to the network manager controller.

Channels 29-30: These channels are not processed by the network manager interface.

Channel 31:

This channel contains the DS-1 transceiver VI channel information.

Serial Links 30-31

Serial links 30 and 31 for the TM and ADM devices represent channel assignments for two controllers.

Serial Link 30

Channels 1-28: These channels are used for provisioning or control of DS-1's and/or for line shelves. DS-1's are assigned beginning with channel 1 while the line shelves are assigned beginning with channel 28.

The number of each is provisionable. The DS-1's/line shelves use the VI Protocol. The assignments for channels 1-28 are presented in Table 5.

TABLE 5

Channels 1-28 Assignments for Serial Link 30

| Channel | Assignment |
| --- | --- |
| 1 | DS-1 1 OR LC 7 LINK #4 |
| 2 | DS-1 2 OR LC 7 LINK #3 |
| 3 | DS-1 3 OR LC 7 LINK #2 |
| 4 | DS-1 4 OR LC 7 LINK #1 |
| . | . |
| . | . |
| . | . |
| 25 | DS-1 25 OR LC 1 LINK #4 |
| 26 | DS-1 26 OR LC 1 LINK #3 |
| 27 | DS-1 27 OR LC 1 LINK #2 |
| 28 | DS-1 28 OR LC 1 LINK #1 |

Channel 29:
This channel is used for provisioning and control of the DTAU DS-1.

Channel 30:
This channel is used for provisioning and control of the Network Manager DS-1 port.

Channel 31:
This channel contains the V and I channel to the network manager. This channel is used for communications between the TM or ADM controllers to network manager controller 38 (see FIG. 1).

Serial Link 31
The serial transport frame format channel assignments for serial link 31 are presented in Table 6.

TABLE 6

Channels 1-31 Assignments for Serial Link 31

Channels 1-2
These channels are used for the two orderwire channels in the SONET overhead. For the terminal multiplexer, the channels are the local and express orderwires. For the add/drop multiplexers, both channels are the local orderwires.

Channels 3-5
These channels are used for the east OS communications. Three channels are allocated for the 192 kilobits per second OS in the SONET overhead. The extracted channel uses the HDLC protocol.

Channels 6, 13 and 14
These channels are used with the west OS communications. Three channels are allocated for the 192 kilobits per second OS in the SONET overhead. The extracted data channel uses the HDLC protocol.

Channel 7:
This channel is used for the 64 kilobits per second common signalling channel. This data channel uses the HDLC protocol. This channel is not used for terminal multiplexers and add/drop multiplexers.

Channel 8:
This channel is used as a test channel and provides both transmit and receive functions.

Channels 9-11:
These channels are broadcast channels.

Channel 12:
This channel contains the path tracer from the east or west OC-1/STS-1 interface.

Channel 15:
This channel is used for provisioning control of the east OC-1/STS-1. This channel operates in a VI protocol.

Channel 16:
This channel is used for provisioning control of the west OC-1/STS-1. This channel operates in a VI protocol.

Channel 17:
This channel is used for a 64/4 kilobits per second EOC channel. This data channel uses the HDLC protocol. The ESF 4 kilobits per second serial transport frame link contains a superframe mark and a frame bit.

Channels 18-31:
These channels are reserved.

The 32 channels of the serial transport frame format 29 are associated with a network manager 38 while links 30 and 31 are associated with a controller channel allocation. In particular, link 30 uses channels 1-28 for provisioning and control of the 28 DSI channels and/or associated line shelves. Channel 29 of link 30 is used for provisioning and control of the DTAU DS-1 while channel 3 is used for provisioning and control of the network manager DS-1 port.

Channel 31 contains the valid interrupt channel to the network manager. This channel is used for communications between the terminal multiplexer, the add/drop multiplexer, controllers and the network manager controller.

Serial Transport Frame Format Frame Synchronization

The serial transport frame uses a unique framing pattern for channel 0 for purposes of synchronization. Specifically, the pattern uses bits 1-7 with the following binary values: 0 1 0 0 1 1 1. This code is a 7 bit Barker Code. This code is alternated on even and odd frames with its compliment so as to prevent accidental framing on a repeated steady-state pattern.

The synchronization pattern for the even and odd frames is as presented below in Table 7.

TABLE 7

| | Channel 0 Frame Synchronization Pattern | | | | | | | | | | | | | | | |
| --- | --- | --- | --- | --- | --- | --- | --- | --- | --- | --- | --- | --- | --- | --- | --- | --- |
| Bit # | 0 | 1 | 2 | 3 | 4 | 5 | 6 | 7 | 8 | 9 | 10 | 11 | 12 | 13 | 14 | 15 |
| Even frame | X | 0 | 1 | 0 | 0 | 1 | 1 | 1 | X | X | X | X | X | X | X | P |
| Odd frame | X | 1 | 0 | 1 | 1 | 0 | 0 | 0 | X | X | X | X | X | X | X | P |

P stands for the channel parity bit which is even parity on the 16 bit channel for the current channel and serves as an additional check for correct synchronization. The channel parity bit also helps prevent false framing and gives a running measure of possible transmission problems.

The "X's" represent "don't care" bits; that is, bits which may be either 1 or 0. These bits do not have any relevance with regard to synchronization.

Figure 5:
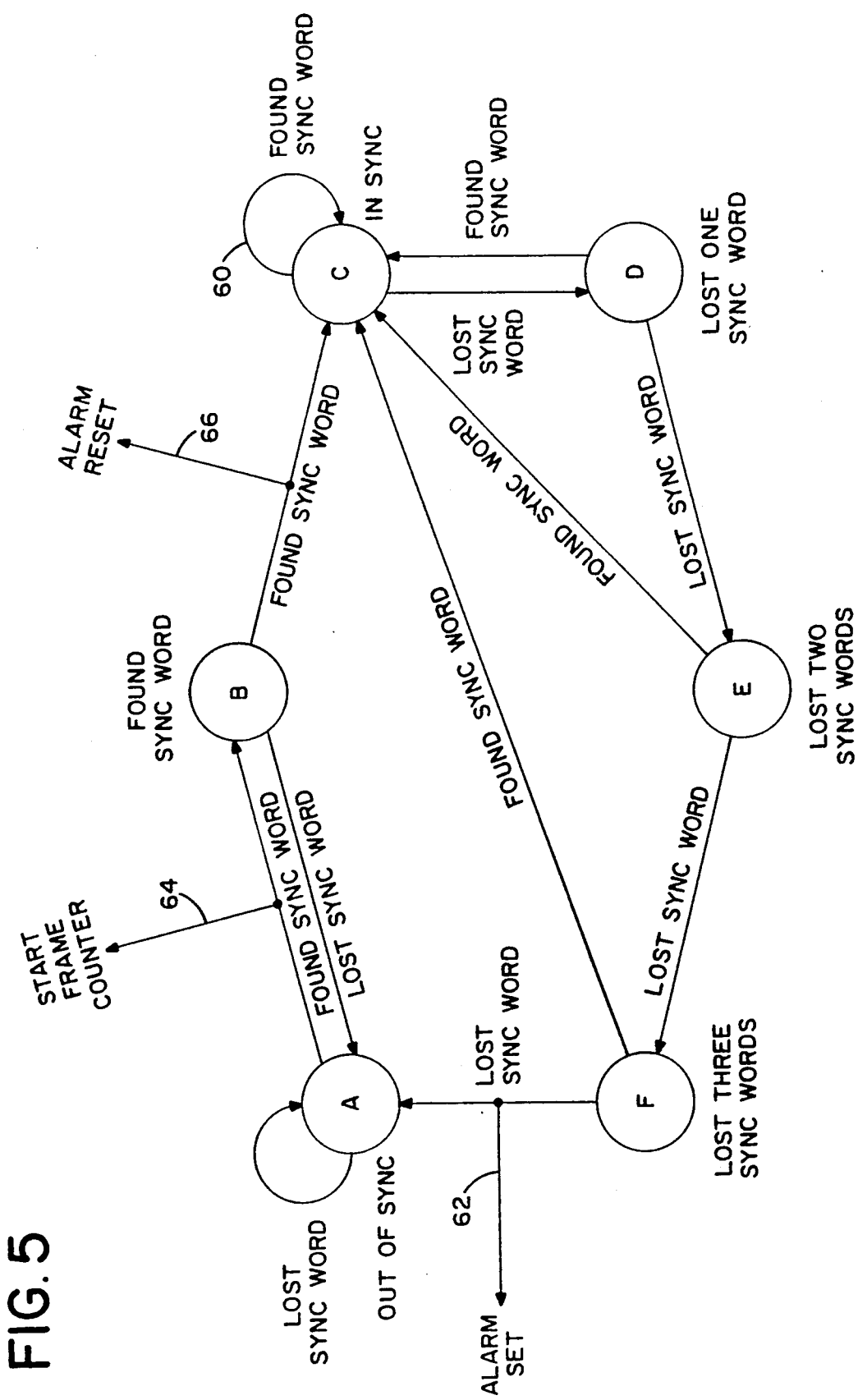
FIG. 5 is a state diagram with regard to determining "in synchronization" and "out of synchronization" states for the synchronization data forming part of the serial transport frame format.

The synchronization state diagram is based on the International Consultive Committee For Telephone and Telegraph (CCITT) standard for thirty-two time slot pulse coded modulation (PCM) and can be represented by a six state machine as shown in FIG. 5 and as set forth in Table 8.

TABLE 8

| Frame Synchronization States and Next States | | | |
|---|---|---|---|
| Current State | Detector Condition | Next State | Next Action |
| A Out of Sync | Found sync word | B | Start frame counter |
|  | Lost sync word | A | Set alarm flag |
| B Found Sync word | Found sync word | C | Reset alarm flag |
|  | Lost sync word | A | Restart search |
| C In sync | Found sync word | C |  |
|  | Lost sync word | D |  |
| D Lost 1st sync | Found sync word | C |  |
|  | Lost sync word | E |  |
| E Lost 2 syncs | Found sync word | C |  |
|  | Lost sync word | F |  |
| F Lost 3 syncs | Found sync word | C |  |
|  | Lost sync word | A | Set alarm flag |

FIG. 5 diagrammatically represents the states and the conditions which cause a change of state as set forth in Table 8. It is seen that if the system is in an "out of synchronization" state (state A) and if the synchronization word is found in channel zero, the system proceeds to state B, that is a "sync word has been found" state. This condition also causes a "start frame counter" 64 to be set. This counter is maintained in a reset state until a valid synchronization word is detected.

When the "start frame counter" signal is generated, the frame counter is released and counting begins. After 125 microseconds, the counter indicates that the start of a new frame has been reached and the state of the bits in channel zero are checked against the expected synchronization word and the state machine then proceeds to the next state. If the next sync word is found, then the system goes to state C which is the "in synchronization" state. This condition also causes an alarm reset signal 66 to be generated. The system remains in State C as shown by arrow 60 provided that the synchronization word is found for each subsequent frame.

If the synchronization word is not found (the lost synchronization word condition) then the system transfers to state D, that is the "lost 1 synchronization word" state. If the next sync word is not found, then the system proceeds to state E; that is, the "lost 2 synchronization words" state.

If the next sync word is again not found, the system proceeds to State F, the "lost 3 synchronization words" state.

When the system is in State D, E or F and a sync word is next found, the system proceeds back to state C, that is the "in sync" state. However if while in state F the next sync word is not found, the system proceeds to state A, the "out of sync" state and simultaneously sets an alarm condition as shown by arrow 62.

In this manner synchronization is determined, maintained and lost, depending upon perceived conditions concerning the synchronization word within channel zero of the serial transport frame format.

Serial Transport Frame VI Channel

The VI channel which can be one or more of the channels of a serial transport frame format, provides the alarm, provisioning and communication channel used between various modules comprising devices such as, the terminal multiplexer 22 and the add/drop multiplexer 24 shown in FIG. 1. The format of this channel is suitable for both message communications between intelligent sub-systems, such as central processors, and register oriented control of non-intelligent devices, such as DS-1 transceivers. The format uses the entire 128 kilobits per second bandwidth of each channel (4.096 megabits/sec divided by 32 = 128 kilobits/sec). Half of the bandwidth (bits 8-15, see FIG. 8), 64 kilobits, is dedicated to control and synchronization of the receiving device while the remaining 64 kilohertz bandwidth (bits 0-7) is used for data transfer. The format of the VI channel is transparent to the serial transport frame format channel in general. Bit 8 is the valid data, V, bit, bit 9 is the interrupt, I, bit, bits 10-14 are address offset bits and bit 15 is the channel parity bit. The V and I bits are active low.

The V bit indicates that the data presented in bits 0-7 is valid while the I bit represents an interrupt for high priority data. The offset bits are used to specify a specific control register for offset within a message buffer where the data is to be delivered.

In some applications, the data to be transferred may require two bytes. The controllers in the terminal multiplexers and add/drop multiplexers use software which operates asynchronously to the serial transfers and it is therefore possible for the software to read a data field which is in an invalid state. Such a state occurs when one, but not both bytes of the multi-byte field have been transferred, and is referred to as a "split" state. Such conditions occur when software attempts to read the data during the split state. In order to recover from such a split state condition, the condition must be detectable. Thus one bit position in each multi-byte counter serves as a split detection flag.

In particular, all split detection flags on an individual unit reflect the state of a common indicator with respect to that unit. This indicator toggles after each complete VI transmission cycle, that is after the transmission of all 32 registers. In this manner, the software is able to determine the correlation of adjacent bytes as they are read. A split condition is recognized when the a split detection flags in adjacent bytes are different. The software then takes appropriate recovery action. The split detection flag, when used, is placed in the most significant bit of a byte. The recovery mechanism is used for counters which occupy 9 to 14 bits of information. These bits of information therefore occupy 2 bytes for purposes of serial transport transfer and are organized such that one of the two bytes may be transferred twice, once immediately before and once immediately after the other byte of information as set forth in Table 9.

TABLE 9

| Split Field Detection Flags and Associated Data | | | | | | | | |
|---|---|---|---|---|---|---|---|---|
| VI Channel Address Offset | VI Channel Data | | | | | | | |
| n | SDF | D6 | D5 | D4 | D3 | D2 | D1 | D0 |
| n + 1 | SDF | D13 | D12 | D11 | D10 | D9 | D8 | D7 |
| n + 2 | SDF | D6 | D5 | D4 | D3 | D2 | D1 | D0 |

In Table 9 "SDF" represents the split field detection flag, "D0" through "D13" represent a data field consisting of up to 14 bits.

As described, the serial transport frame format VI channel address offsets "n" and "n+2" carry the same information. By using this technique in conjunction with the split detection flags, it is possible to accurately read the value of the data field at any time. At any point in time, the split field may exist between any two bytes in the transfer, but it cannot exist in more than one place. Therefore if the split is detected by means of split field detection flags, an uncorrupted value can always be obtained due to the duplication of one of the bytes.

Implementation

In addition to the description already presented, detailed implementation for the serial transport frame format is presented in an application entitled "Synchronous Optical Transmission System", filed on the same date hereof, and assigned to the same assignee. This patent application is hereby incorporated by reference. It presents the technical descriptions of each module shown in FIG. 2, 3 and 4 of the present application, including the interfacing between the DS-1 modules 58 and TSM module 52 (see FIGS. 2 and 3) and between the non-redundant controller 56 and the TSM 52. It also presents details on each application specific integrated circuit used and the associated firmware.

Furthermore, FIG. 9 of the present application presents a block diagram of a serial link output 48 from incoming parallel data and control information while FIG. 10 shows an overall block diagram of serial links 48 from a DS-1 to serial link interface also using the serial transport frame format.

SUMMARY

Thus what has been described is a serial transport frame format for transferring data between two locations, such that the data is always transferred in channels with associated control information. The associated control information can include signalling information if the data corresponds to telephony information. It can also include, depending upon the nature of the channel data, timing information, valid data information, interrupt information, address information and channel parity information.

One channel per frame contains frame synchronization information used by the interconnected modules to determine whether the serial transport frame format is being accurately received. The serial transport frame format includes a predetermined number of channels per frame, each channel having a predetermined size. The entire frame is transmitted during a predetermined length of time.

In this manner, a flexible and expandable system for defining serial data is presented which facilitates communications between modules such as those used to implement terminal multiplexers, add/drop multiplexers and the like as used in telephony, and in particular as used in telephony associated with a synchronous optical network.

It is therefore seen that the object set forth above and those made apparent from the preceding description, are efficiently attained and, since certain changes may be made in carrying out the above serial transport frame format without departing from the scope of the invention, it is intended that all matter contained in the above description or shown in the accompany drawings shall be interpreted as illustrative and not in a limiting sense.

It is also to be understood that the following claims are intended to cover all of the generic and specific features of the serial transport frame format herein described and all statements of the scope of the invention which, as a matter of language, might be said to fall therebetween.

Having described the invention, what is claimed is:

1. A serial transport frame format method for positioning information to be transferred in a serial bit stream, comprising the steps of:

1) arranging the data to be transferred in frames, where each frame comprises N channels, each channel having a fixed length of bits, where N is an integer greater than one;
2) for each of m of said N channels, where M is an integer less than N, placing data, representing information to be conveyed, in a first portion of the channel;
3) for each of M channels, placing control information related to the data in that channel in a second portion of the channel; and
4) placing synchronization data in at least one channel of each frame.

2. A serial transport frame format method as defined in claim 1, wherein the channel associated control information for each of at least some of said M channels comprises signalling information associated with the corresponding data in the first portion of the channel.

3. A serial transport frame format method as defined in claim 2, wherein the channel associated control information for each of at least some of said M channels contains timing information associated with the corresponding data in the first portion of the channel.

4. A serial transport frame format method as defined in claim 3, wherein the channel associated control information for each of at least some of said m channels further comprises parity information associated with the remaining bits of the corresponding channel.

5. A serial transport frame format method as defined in claim 4, wherein at least one of the N channels of each frame contains data in a first portion of the channel and at least a valid bit and an interrupt bit in a second portion of the channel along with associated address bits related to the data in the first portion of the channel.

6. A serial transport frame format method as defined in claim 5 for the transfer of information in systems comprising redundant A and B paths for the transfer of information between two locations, wherein the channel that contains synchronization information comprises a first portion and a second portion and wherein the second portion contains information regarding the A or B path selected.

7. A serial transport frame format method as defined in claim 6, wherein the second portion of the channel that contains synchronization information further comprises clocking information related to the serial transport frame.

8. A serial transport frame format method as defined in claim 7, wherein the first portion of the channel that contains synchronization information comprises parity information.

9. A serial transport frame format method as defined in claim 8, wherein the second portion of the channel that contains synchronization information further comprises parity information.

10. A serial transport frame format method as defined in claim 1, wherein the channel associated control information for each of at least some of said M channels contains timing information associated with the data in the first portion of the channel.

11. A serial transport frame format method as defined in claim 10, wherein the channel associated control information for each of at least some of said M channels further comprises parity information associated with the remaining bits of the channel.

12. A serial transport frame format method as defined in claim 1, wherein the channel associated control information for each of at least some of said M channels further comprises parity information associated with the remaining bits of the channel.

13. A serial transport frame format method as defined in claim 1, wherein at least one of the N channels of each frame contains data in the first portion of the channel and at least a valid bit and an interrupt bit in the second portion of the channel along with associated address bits related to the data in the first portion of the channel.

14. A serial transport frame format method as defined in claim 1 for the transfer of information in systems comprises redundant A and B paths for the transfer of information between two locations, wherein the channel that contains synchronization information comprises a first portion and a second portion and wherein the second portion contains information regarding the A or B path selected.

15. A serial transport frame format method as defined in claim 14, wherein the second portion of the channel that contains synchronization information further comprises clocking information related to the serial transport frame.

16. A serial transport frame format method as defined in claim 15, wherein the first portion of the channel that contains synchronization information comprises parity information.

17. A serial transport frame format method as defined in claim 16, wherein the second portion of the channel that contains synchronization information further comprises parity information.

18. A serial transport frame format as defined in claim 1, wherein the fixed length of bits for each channel is equal to 16.

19. A serial transport frame format as defined in claim 18, wherein N is equal to 32.

20. A serial transport frame format as defined in claim 1, wherein the synchronization data comprises seven bits corresponding to a Barker Code, wherein the synchronization data is complemented in alternating frames.

21. A serial transport frame format as defined in claim 20, further comprising a method of determining synchronization from the synchronization data in the serial transport frame, wherein the method comprises six states; namely, an A, Out of Sync state representing that synchronization has not been determined, a B, Found Sync word representing that synchronization data has been detected, a C, In Sync state representing that synchronization data has been detected in two consecutive frames, a D Lost First Sync state representing that synchronization data has not been detected for the current frame, an E, Lost Two Syncs state representing that synchronization data has not been detected for the last two consecutive frames, and an F, Lost Three Sync state representing that synchronization data has not been detected for the last three consecutive frames; and two detector conditions; namely, a found synchronization word condition, and a lost synchronization word condition, and wherein the transfer from one of the six states to the next state is set forth below:

| Current State | Detector Condition | Next State |
| --- | --- | --- |
| A Out of Sync | Found sync word | B |
|  | Lost sync word | A |
| B Found Sync word | Found sync word | C |
|  | Lost sync word | A |
| C In sync | Found sync word | C |

| Current State | Detector Condition | Next State |
| --- | --- | --- |
|  | Lost sync word | D |
| D Lost 1st sync | Found sync word | C |
|  | Lost sync word | E |
| E Lost 2 syncs | Found sync word | C |
|  | Lost sync word | F |
| F Lost 3 syncs | Found sync word | C |
|  | Lost sync word | A |

22. A serial transport frame format as defined in claim 1, further comprising a method of determining synchronization from the synchronization data in the serial transport frame, wherein the method comprises six states; namely, an A, Out of Sync state representing that synchronization has not been determined, a B, Found Sync word representing that synchronization data has been detected, a C, In Sync state representing that synchronization data has been detected in two consecutive frames, a D, Lost First Sync state representing that synchronization data has not been detected for the current frame, an E, Lost Two Syncs state representing that synchronization data has not been detected for the last two consecutive frames, and an F, Lost Three Sync state representing that synchronization data has not been detected for the last three consecutive frames; and two detector conditions; namely, a found synchronization word condition and a lost synchronization word condition, and wherein the transfer from one of the six states to the next state is set forth below:

| Current State | Detector Condition | Next State |
| --- | --- | --- |
| A Out of Sync | Found sync word | B |
|  | Lost sync word | A |
| B Found Sync word | Found sync word | C |
|  | Lost sync word | A |
| C In sync | Found sync word | C |
|  | Lost sync word | D |
| D Lost 1st sync | Found sync word | C |
|  | Lost sync word | E |
| E Lost 2 syncs | Found sync word | C |
|  | Lost sync word | F |
| F Lost 3 syncs | Found sync word | C |
|  | Lost sync word | A |

23. A serial transport frame format method for positioning information to be transmitted in a serial bit stream, comprising the steps of:
1) arranging the data to be transferred in a plurality of frames, where each frame comprises N channels, each channel having a fixed length of bits, where N is an integer greater than one;
2) for each of M of said N channels in at least some of the plurality of frames, where M is an integer greater than zero and less than N, placing data, representing information to be conveyed, in one portion of the channel;
3) for each of said M channels, placing control information related to the data in that channel, in a second portion of the channel; and
4) placing synchronization data in at least one channel of each frame.

24. A serial transport frame format method as defined in claim 23, wherein the channel associated control information for each of at least some of said M channels comprises signalling information associated with the corresponding data in the first portion of the channel.

25. A serial transport frame format method as defined in claim 24, wherein the channel associated control information for each of at least some of said M channels contains timing information associated with the corresponding data in the first portion of the channel.

26. A serial transport frame format method as defined in claim 25, wherein the channel associated control information for each of at least some of said M channels further comprises parity information.

27. A serial transport frame format method as defined in claim 26, wherein at least one of the N channels of each frame contains data in the first portion of the channel and at least a valid bit and an interrupt bit in the second portion of the channel along with associated address bits related to the data in the first portion of the channel.

28. A serial transport frame format method as defined in claim 23, wherein the channel associated control information for each of at least some of said M channels contains timing information associated with the data in the first portion of the channel.

29. A serial transport frame format method as defined in claim 23, wherein at least one of the N channels of each frame contains data in the first portion of the channel and at least a valid bit and an interrupt bit in the second portion of the channel along with associated address bits related to the data in the first portion of the channel.

30. A serial transport frame format method as defined in claim 23 for the transfer of information in systems comprising redundant A and B paths for the transfer of information between two locations, wherein the channel that contains synchronization information comprises a first portion and a second portion and wherein the second portion contains information regarding the A or B path selected.

* * * * *